(12) United States Patent
Gronberg

(10) Patent No.: US 6,728,259 B1
(45) Date of Patent: Apr. 27, 2004

(54) LINK ADAPTATION ALGORITHM FOR PACKET BASED RADIO SYSTEM

(75) Inventor: Petri Gronberg, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/461,490

(22) Filed: Dec. 14, 1999

(51) Int. Cl.[7] ............................................... H04J 3/22
(52) U.S. Cl. ..................................... 370/465; 370/252
(58) Field of Search ................................ 370/216, 252, 370/253, 389, 465, 471

(56) References Cited

U.S. PATENT DOCUMENTS

| | | | | |
|---|---|---|---|---|
| 4,490,817 A | * | 12/1984 | Turner | 370/244 |
| 5,150,368 A | * | 9/1992 | Autruong et al. | 714/747 |
| 5,490,168 A | | 2/1996 | Phillips et al. | 375/224 |
| 6,301,265 B1 | * | 10/2001 | Kleider et al. | 370/465 |
| 6,424,631 B1 | * | 7/2002 | Czaja et al. | 370/252 |

OTHER PUBLICATIONS

Pursley, M. B., et al.; "Adaptive–Rate Coding for Frequency–Hop Communications Over Rayleigh Fading Channels"; IEEE Journal on Selected Areas in Communications, IEEE INC.; New York, US; vol. 17, No. 7; Jul. 1999; pp. 1224–1231.

Bit Error Rate Based Link Adaptation for GSM, J. Pons and J. Dunlop, Proceedings of the 1998 9th IEEE International Symposium on Personal, Indoor and Mobile Radio Communications, PIMRC, Part 3, pp. 1530–1534.

* cited by examiner

*Primary Examiner*—Chi Pham
*Assistant Examiner*—Nhat Do
(74) *Attorney, Agent, or Firm*—Harrington & Smith, LLP

(57) ABSTRACT

A method is disclosed for operating a channel coder, as is a channel coder that operates in accordance with the method. The method includes steps of (a) maintaining a first count (N_Number) of transmitted packets and a second count (K_Number) of packets that are erroneously decoded at a receiver; (b) periodically performing a plurality of statistical tests using current values of the first and second counts; and (c) based on a result of the statistical tests, controlling the channel coder to either maintain a current channel coding technique or to switch to another channel coding technique. The step of controlling includes a further step of resetting the first count and the second count.

3 Claims, 3 Drawing Sheets

LINK ADAPTATION ALGORITHM FOR PACKET BASED RADIO SYSTEM

FIELD OF THE INVENTION

This invention relates generally to digital radio data communication systems and methods and, more particularly, to link adaptation techniques for selecting an optimum channel coding for a particular radio channel quality.

BACKGROUND OF THE INVENTION

In digital radio systems the information is typically transmitted in data packets using a particular type of channel coding. The goal of channel coding is to improve the transmission quality when the transmitted signal encounters radio channel disturbances. When a data packet is coded, some amount of redundant information is added to the source data. A subsequent decoding operation then makes use of the redundant information to detect and/or correct bit errors that occurred during the transmission.

When the amount of redundant information is increased the error correction capabilities of the decoder can be improved. However, the improvement in error correction capabilities comes at the cost of a reduced net bit rate. As can be appreciated, it would be advantageous to use a robust channel coding technique during poor radio propagation conditions, and a channel coding technique having a high net bit rate when the radio channel conditions are good.

It is known in the art to employ link adaptation algorithms in an attempt to select an optimum channel coding technique for a given radio link. The selection of a particular channel coding technique is based on link or channel quality estimates.

In a typical link adaptation algorithm the receiver measures a carrier to interference ratio (C/I) or a raw Bit Error Rate (BER), and then makes an estimate of the channel quality by averaging the measurements over some period of time. Reference in this regard can be had to a publication entitled "Bit Error Rate Based Link Adaptation for GSM", J. Pons and J. Dunlop, Proceedings of the 1998 9th IEEE International Symposium on Personal, Indoor and Mobile Radio Communications", PIMRC, Part 3, pages 1530–1534.

In general, a link adaptation algorithm makes the decision of whether to maintain or change a current channel coding technique by comparing the estimated channel quality with one or more threshold values. Some amount of hysteresis is typically used in the comparison to avoid ping-pong effects (i.e., repetitive switching between channel coding techniques when the estimated channel quality is about equal to the switching threshold value.)

If the particular link adaptation algorithm is run by the receiver, then signalling is arranged so that the receiver can command the transmitter to use the selected channel coding technique. Otherwise, the signalling is arranged so that the receiver sends the channel quality estimates to the transmitter, which then executes the desired link adaptation algorithm.

A problem arises in these conventional approaches in that, for some cases, an ability to make the channel quality estimation in terms of the C/I or BER may be difficult, inaccurate or even impossible. For example, the receiver may not have sufficient processing power to perform the required measurements. In this case a reduced complexity link adaptation algorithm can be used, such as one that simply counts the numbers of successfully decoded and unsuccessfully decoded packets. However, the packet counting approach, while computationally less complex than other types of channel quality estimation techniques, may result in a problematic link adaptation algorithm. For example, in order to obtain an accurate estimate of a packet error rate (PER) value a significant number of packets must be received, thereby resulting in a slow algorithm. As such, the link adaptation approach based on packet counting will not be capable of rapidly responding to changes in radio channel conditions.

OBJECTS AND ADVANTAGES OF THE INVENTION

It is a first object and advantage of this invention to provide an improved link adaptation algorithm that overcomes the foregoing and other problems.

It is a further object and advantage of this invention to provide an improved link adaptation algorithm that uses a channel estimation technique based on counting numbers of received and unsuccessfully received packets, and that more quickly adapts to changing channel conditions than conventional packet counting-based techniques.

It is another object and advantage of this invention to provide an improved link adaptation algorithm that uses a channel estimation technique based on counting numbers of received and unsuccessfully received packets, and that improves the speed of the packet counting algorithm by employing statistical testing methods to determine whether a current channel coding technique should be changed.

SUMMARY OF THE INVENTION

The foregoing and other problems are overcome and the objects of the invention are realized by methods and apparatus in accordance with embodiments of this invention.

A method is disclosed for operating a channel coder, as is a channel coder that operates in accordance with the method. The method includes steps of (a) maintaining a first count (N_Number) of transmitted packets and a second count (K_Number) of packets that are erroneously decoded at a receiver; (b) periodically performing a plurality of statistical tests using current values of the first and second counts; and (c) based on a result of the statistical tests, controlling the channel coder to either maintain a current channel coding technique or to switch to another channel coding technique. The step of controlling includes a further step of resetting the first count and the second count.

In a presently preferred embodiment the step of periodically performing a plurality of statistical tests includes steps of (b1), at a crossing point where a first channel coding algorithm (CS-1) and a second channel coding algorithm (CS-2) provide a same net bit rate, assuming as a first hypothesis that a packet error rate (PER) is greater than a PER of CS-1, P1, if CS-1 is currently being used, or assuming as the first hypothesis that the PER is less than a PER of CS-2, P2, if CS-2 is currently being used; (b2) assuming as reference case that N_Number of packets have been transmitted with a constant PER equal to either P1 or P2, depending on the currently used channel coding algorithm CS-1 or CS-2; (b3) determining a first probability (P-value) using the first count and the second count and the constant PER P1 or P2, depending on the currently used channel coding algorithm CS-1 or CS-2; (b4) comparing P-value to a risk level (RL) for determining whether the first hypothesis can be rejected; and (b5) only if the first hypothesis is rejected, changing to the other channel coding algorithm and resetting N_Number and K_Number.

The step of periodically performing a plurality of statistical tests includes further steps of (b6) assuming as a second hypothesis that PER is less than the PER of CS-1, P1, if CS-1 is currently being used, or assuming as the second hypothesis that the PER is greater than the PER of CS-2, P2, if CS-2 is currently being used; (b7) assuming the same reference case as in step (b2); (b8) determining a second probability (P-value) using the first count and the second count and the constant PER P1 or P2, depending on the currently used channel coding algorithm CS-1 or CS-2; (b9) comparing P-value to RL for determining whether the second hypothesis can be rejected; and (b10) only if the second hypothesis is rejected, resetting N_Number and K_Number without changing to the other channel coding algorithm.

In the presently preferred embodiment the step of periodically performing a plurality of statistical tests includes steps of accessing at least one look-up table using the current values of the first and second counts to retrieve probability values (P-values); and comparing the retrieved P-values to a threshold to determine whether the assumed hypothesis should be accepted or rejected.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
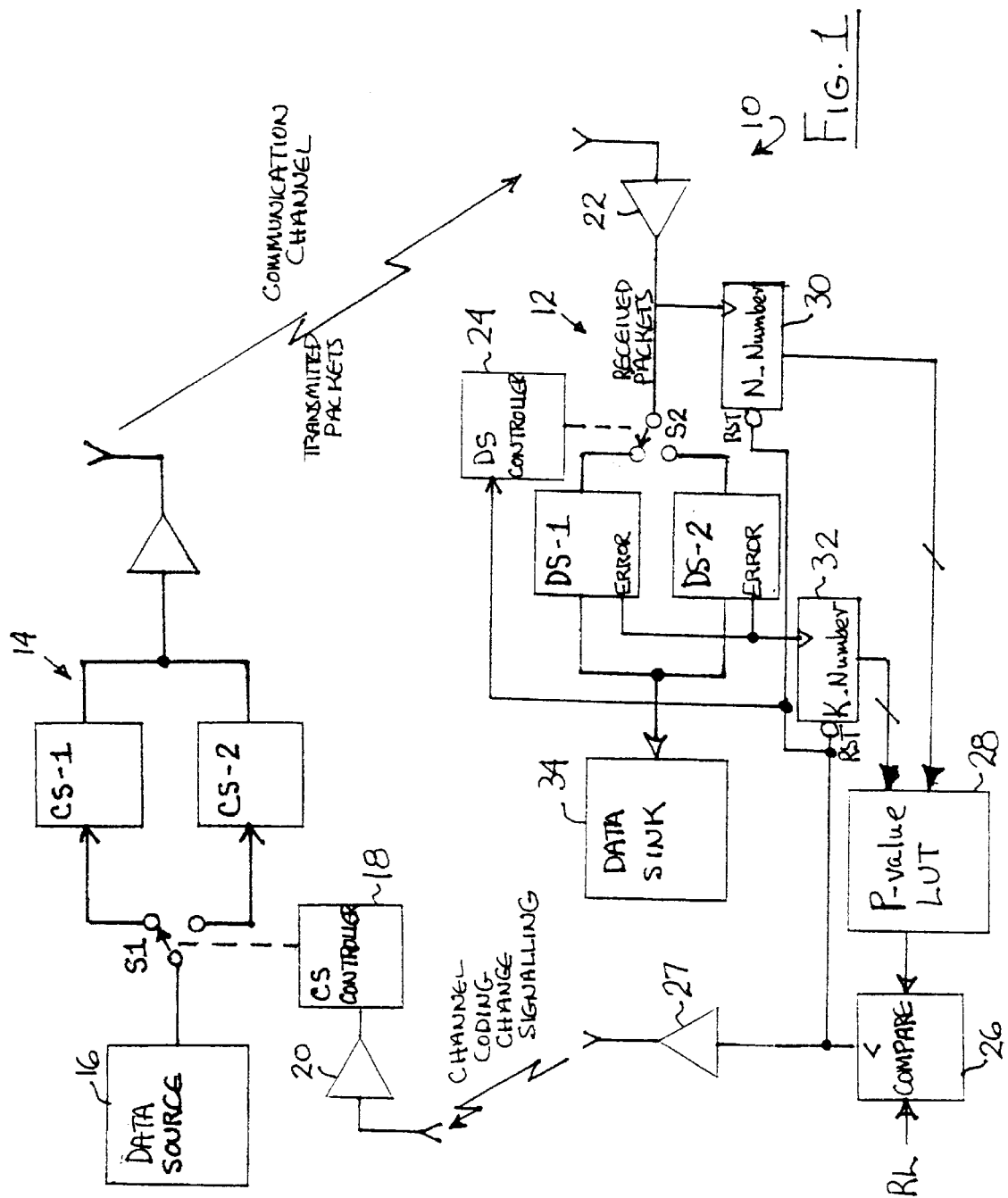
FIG. 1 is a conceptual block diagram of a packet data communication system that operates in accordance with this invention.

The presently preferred link adaptation algorithm is based on statistical testing methods. In statistical testing a certain hypothesis is made and then studied (tested), wherein a determination is made of a probability (P-value) that a constructed reference case would generate observed measures with the condition of the hypothesis. Based on the obtained probability the hypothesis is either accepted or rejected.

Consider a case that is pertinent to the teachings of this invention, wherein two different channel coding algorithms or schemes, CS-1 and CS-2, can be used. CS-1 is assumed to be more robust than CS-2. As in most link adaptation techniques, one determines beforehand the point where both CS-1 and CS-2 give the same net bit rate (the crossing point of CS-1 and CS-2). This can be accomplished either by link level simulations or by experimental tests. Assume that at the crossing point between CS-1 and CS-2 the packet error rate (PER) values for CS-1 and CS-2 are P1 and P2, respectively. If CS-1 is used, and if the PER is less than P1, then it would be advantageous to change to CS-2. If CS-2 is used, and if the PER is larger than P2, then it would be advantageous to change to CS-1. Since CS-1 is more robust that CS-2, P2 is larger than P1.

In accordance with the teachings of this invention, during a packet data transmission two counters are updated: N_Number gives a total number of packets, and K_Number gives a number of erroneously decoded packets that have been transmitted since the last link adaptation decision.

After each transmitted packet, or alternatively at certain predetermined intervals, two of the following four statistical tests are performed (either 1 and 2, or 3 and 4).

1. Current channel coding is CS-1; change to CS-2?
Hypothesis: PER>P1

Reference case: N_Number of packets have been transmitted with a constant PER value of P1. In this reference case the number of erroneous packets follow a binomial distribution.

$$P-\text{value} = \sum_{i=0}^{K...Number} \binom{N...Number}{i} P1^i (1-P1)^{N...Number-i}$$

If P-value is less than a certain risk level (RL, a typical value of which is about 5%), the hypothesis can be rejected with (1-RL) confidence. This means that it is unlikely that the reference case would yield the observed measures with the condition of PER>P1.

The action to be taken in case the hypothesis is rejected is to change to CS-2, and to reset the counters N_Number and K_Number.

The action to be taken in case the hypothesis is accepted is to continue averaging (no action).

Further in this regard, note that the ratio of K_Number divided by N_Number estimates the experienced PER. The longer the variables N_Number and K_Number are counted, the more accurate in a statistical sense is the (average) estimate of the PER, assuming that the radio channel conditions do not change substantially. When the PER is sufficiently accurate, then the optimal channel coding algorithm can be selected.

2. Current channel coding is CS-1; confirm CS-1?
Hypothesis: PER<P1

Reference case: N_Number of packets have been transmitted with a constant PER value of P1. In this reference case the number of erroneous packets follow a binomial distribution.

$$P-\text{value} = \sum_{i=K...Number}^{N...Number} \binom{N...Number}{i} P2^i (1-P2)^{N...Number-i}$$

If P-value is less than RL, a typical value of which is about 5%, the hypothesis can be rejected with (1-RL) confidence. This means that it is unlikely that the reference case would yield the observed measures with the condition of PER<P1.

The action to be taken in case the hypothesis is rejected is to reset the counters N_Number and K_Number (CS-1 is confirmed).

The action to be taken in case the hypothesis is accepted is to continue averaging (no action).

It should be noted that if the first hypothesis is rejected, then the second hypothesis need not be tested. Note further that the two P-values computed for the first hypothesis and for the second hypothesis are nearly complementary to one another, and that the sum of the two P-values is about unity (actually slightly greater than unity). Therefore, if the first hypothesis is rejected, the first P-value is less than RL (which is clearly less than 0.5), and the second P-value will then clearly be larger than 0.5. As a result, it is known that the second hypothesis would have been accepted and not rejected.

3. Current channel coding is CS-2; chance to CS-1?
Hypothesis: PER<P2

Reference case: N_Number of packets have been transmitted with a constant PER value of P2. In this reference case the number of erroneous packets follow a binomial distribution.

$$P-\text{value} = \sum_{i=0}^{K\ldots Number} \binom{N\ldots Number}{i} P2^i (1-P2)^{N\ldots Number-i}$$

If P-value is less than RL, a typical value of which is about 5%, the hypothesis can be rejected with (1-RL) confidence. This means that it is unlikely that the reference case would yield the observed measures with the condition of PER<P2.

The action to be taken in case the hypothesis is rejected is to change to CS-1, and to reset the counters N_Number and K_Number.

The action to be taken in case the hypothesis is accepted is to continue averaging (no action).

4. Current channel coding is CS-2; confirm CS-2?
Hypothesis: PER>P2

Reference case: N_Number of packets have been transmitted with a constant PER value of P2. In this reference case the number of erroneous packets follow a binomial distribution.

$$P-\text{value} = \sum_{i=0}^{K\ldots Number} \binom{N\ldots Number}{i} P2^i (1-P2)^{N\ldots Number-i}$$

If P-value is less than RL, a typical value of which is about 5%, the hypothesis can be rejected with (1-RL) confidence. This means that it is unlikely that the reference case would yield the observed measures with the condition of PER>P1.

The action to be taken in case the hypothesis is rejected is to reset the counters N_Number and K_Number (CS-2 is confirmed).

The action to be taken in case the hypothesis is accepted is to continue averaging (no action).

Having thus described preferred embodiments of the four statistical tests, it should be noted that, in practice, the P-values can be computed beforehand and stored in look-up tables (with indices N_Number and K_Number). In this case the link adaptation decisions can be performed by simply comparing the predefined P-values with the given risk level RL.

It is desirable to restrict the size of the look-up tables to a practical value. There are at least two different ways to accomplish this.

In a first technique, since the binomial distribution approaches a normal distribution when N_Number becomes large, the P-values for large values of N_Number can be defined with a normal distribution (using, for example, a separate look-up table.)

In a second technique, if K_Number increases beyond the look-up table size, the counters N_Number and K_Number can be reset. In this manner the number of samples (and thus the size of the look-up tables) is limited, even if the link adaptation algorithm does not make a decision for a long period of time.

Referring to FIG. 1, there is shown a conceptual block diagram of a packet data communication system 10 that operates in accordance with the statistical testing embodiments discussed above. In the illustrated embodiment it is assumed that a packet data receiver 12 contains first and second channel decoders (DS-1 and DS-2) that correspond to the first and second channel coders (CS-1 and CS-2) of the packet data transmitter 14. The transmitter 14 includes a data source 16 that feeds packets to either CS-1 or CS-2 through a logical switch S1. The state of S1 is controlled by a CS controller 18 that receives a switching command input from the receiver 12 via a receiver 20 and a wireless channel coding change signalling link. The receiver 12 contains a packet data receiver 22 that feeds packets received from a communications channel to either DS-1 or DS-2 via a logical switch S2. The state of S2 is controlled by a DS controller 18 that receives a switching command input from a comparator 26. The comparator 26 operates to compare a P-value output from a P-value look-up table (LUT) 28 to RL. If P-value is less than RL, when the statistical test hypothesis is PER>P1 when CS-1/DS-1 are active, or PER<P2 when CS-2/DS-2 are active, then a channel coding/decoding scheme change is indicated by the less-than output of comparator 26. This output signal is signalled to the transmitter 14, via a signalling transmitter 27. This same signal, also for the cases when the link adaptation algorithm operates to confirm CS-1 or CS-2, is used to reset counters N_Number 30, which counts the number of received packets, and K_Number 32, which counts the number of erroneously decoded packets from the active one of DS-1 or DS-2. The outputs of counter 30 and 32 are used as address inputs to index into the P-value LUT 28, as was described above, so as to retrieve one of the pre-computed P-values. A decoded packet output of the active one of DS-1 or DS-2 is provided to a data sink 34, where the received and decoded packets are stored, displayed, or otherwise acted on in a desired manner. The value of RL can be pre-set, or it may be varied during operation.

In other embodiments of this invention some of the components of the receiver 12, such as the P-value LUT 28 and comparator 26, or just the comparator 26, can be moved to the transmitter 14, and the signalling modified accordingly.

Figure 2:
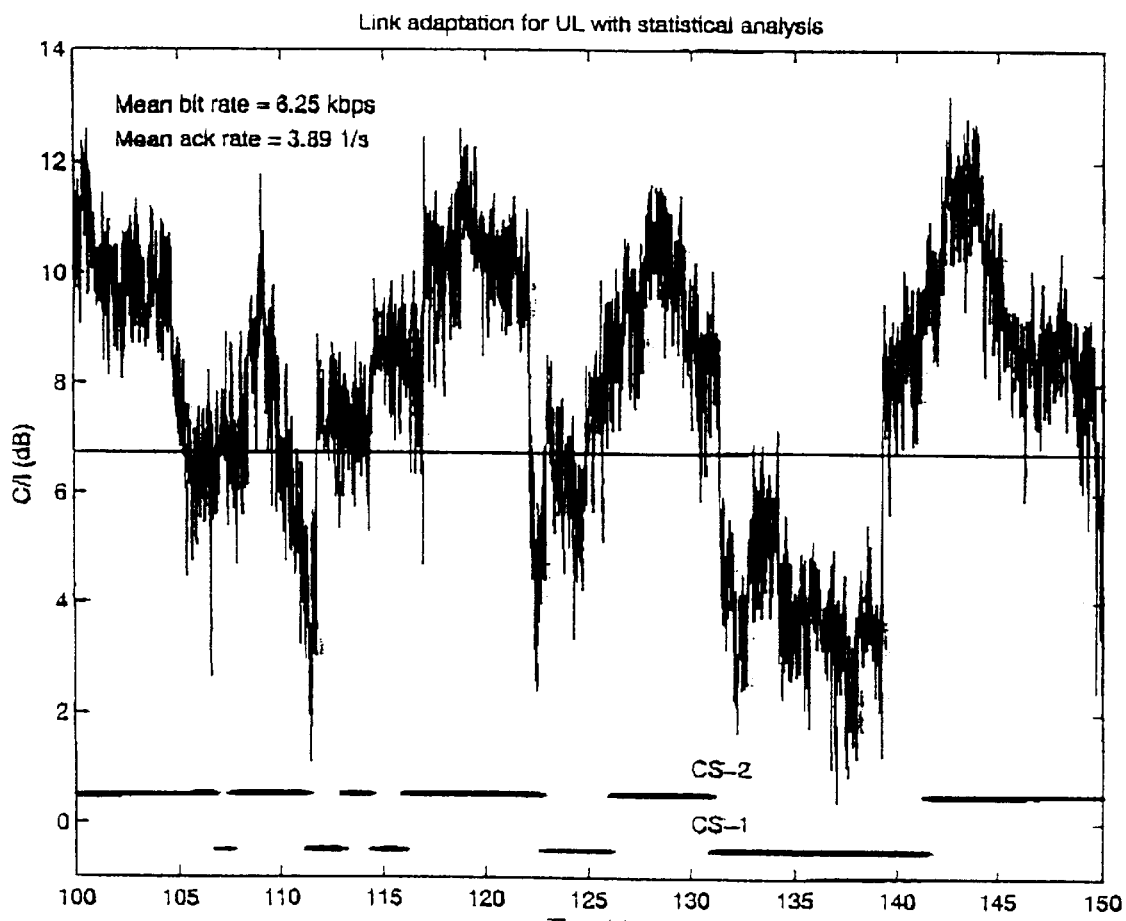
FIG. 2 is a graph of C/I (dB) versus time, and shows CS-switching, in accordance with the presently preferred link adaptation algorithm, when tested in a simulator where a mobile station continuously transmitted data packets to a network under varying C/I conditions.

Referring to FIG. 2, the foregoing link adaptation algorithm was tested in a simulator where a mobile station was continuously transmitting data packets to a network under varying C/I conditions. In this simulation the link adaptation algorithm was run by the network side, and a message was sent to the mobile station whenever the channel coding (CS-1 or CS-2) was changed (see the bottom two traces). This was found to introduce a delay of about 100 milliseconds for switching. In FIG. 2 the mean bit rate was equal to 5.25 kbps, while the mean acknowledgement (ack) rate was 3.89 1/s.

The use of the link adaptation algorithm described above is applicable in various digital radio systems, such as the General Packet Radio Service (GPRS) and Enhanced-GPRS systems, where different channel codings (two or more) can be used. The use of the link adaptation algorithm is especially applicable if the channel quality cannot be measured accurately in terms of C/I or the raw BER.

Furthermore, the link adaptation algorithm described above can be used alone, or it may be used as a part of a larger link adaptation algorithm which also employs one or more channel quality estimates (for instance, PER and C/I) to make the required channel coding decisions.

In general, the use of the link adaptation algorithm described above may be restricted if one of the threshold values (P1) is zero or about zero. In this case the PER measurement may not yield the required information, or the convergence could be unacceptably slow.

Figure 3:
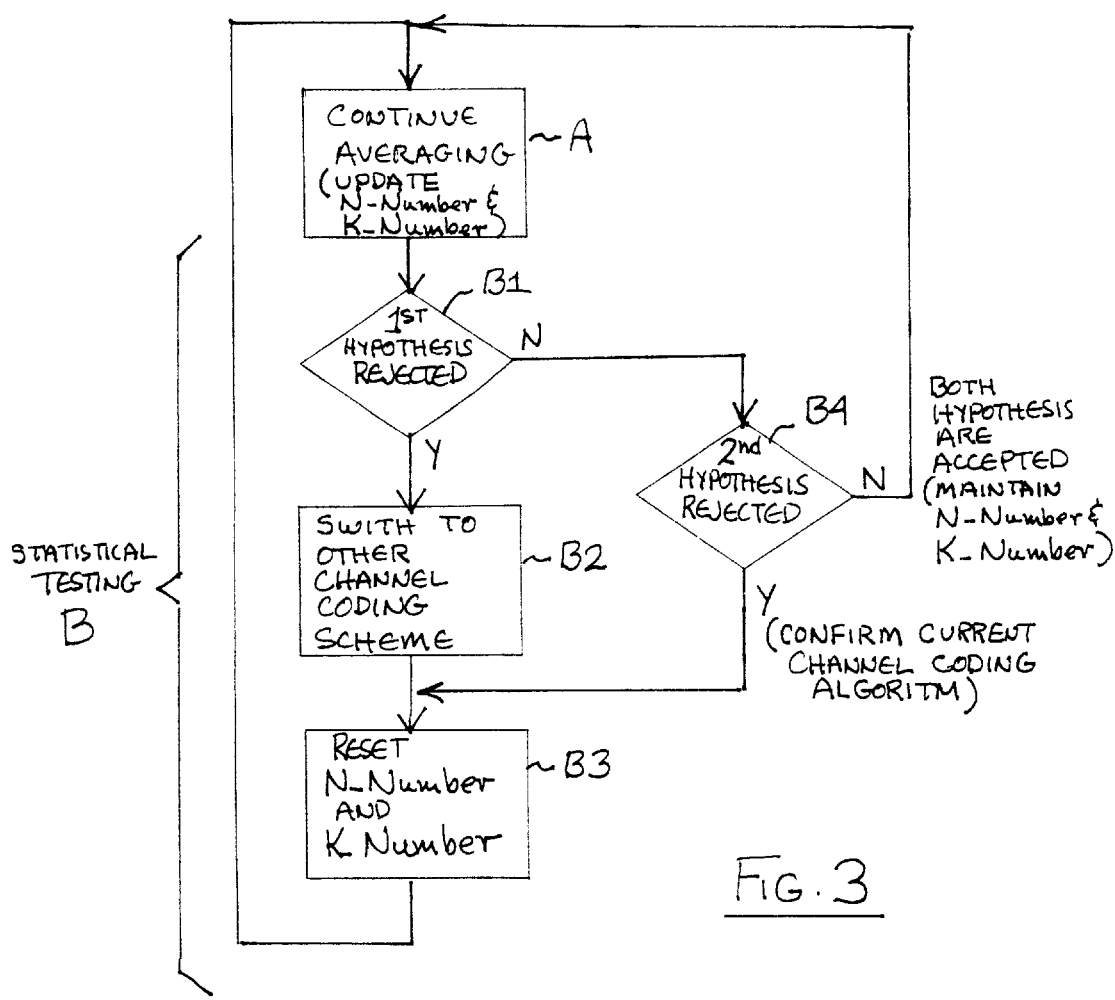
FIG. 3 is a logic flow diagram depicting a method in accordance with the description found herein.

Based on the foregoing description, and referring now to FIG. 3, it can be appreciated that a method has been disclosed for operating a channel coder, as is a channel coder that operates in accordance with the method. The method includes steps of: Step (A), updating a first count (N_Number) of transmitted packets and a second count (K_Number) of packets that are erroneously decoded at a receiver; and Step (B), periodically performing a plurality of statistical tests using current values of the first and second counts. The Step (B) includes a first sub-step (B1) of determining if the first hypothesis is rejected, if yes, performing a second sub-step (B2) of switching to the other channel coding scheme or algorithm, and a sub-step (B3) of resetting the first and second counts, before continuing the averaging step (A). If the result of the first sub-step (B1) determines that the first hypothesis is accepted, control instead passes to sub-step (B4) where a determination is made if the second hypothesis is rejected. If yes, control passes to sub-step (B3) for resetting the first and second counts, before continuing the averaging step (A). If the result of the sub-step (B4) determines that the second hypothesis is also accepted, control instead passes to Step A to continue updating the counts, without first resetting the counts at sub-step (B3).

The invention has been described in the context of a presently preferred embodiments thereof, however the teachings of this invention are not intended to be limited in scope to only these disclosed embodiments. As but one example, while the invention has been described in the context of maintaining a running count of transmitted packets (N_Number) and packets that are erroneously decoded at a receiver (K_Number), it is within the scope of this invention to instead count packets that are successfully decoded at the receiver, and to then derive the value of K_Number by subtracting the number of successfully received packets from N_Number. Alternatively, one could count packets that are successfully decoded at the receiver as well as packets that are unsuccessfully decoded at the receiver, and to then add these two counts to derive N_Number.

Also, the teachings of this invention can be used with a number of suitable channel coding algorithms, such as convolutional channel coding algorithms.

Also, if not performed after each packet, a suitable interval for performing the algorithm (and assuming that the processing load is low) is preferably made short, such as after every two packets. Note should be taken of the fact that with the given parameters P1, P2 and RL, it is possible to compute beforehand those N_Number and K_Number pairs with which a particular hypothesis can be rejected. Based on the obtained N_Numbers it may then be possible to determine a suitable testing interval.

Furthermore, it is within the scope of the teaching of this invention to adapt the testing interval to the channel conditions, although in this event it may be desirable to employ an additional channel quality estimate over and above the results of the testing described above.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a channel coder, comprising steps of:

maintaining a first count (N_Number) of transmitted packets and a second count (K_Number) of packets that are erroneously decoded at a receiver;

periodically performing a plurality of statistical tests using current values of the first and second counts; and based on a result of said statistical tests, controlling said channel coder to either maintain a current channel coding technique or to switch to another channel coding technique, wherein the step of periodically performing a plurality of statistical tests is comprised of steps:

at a crossing point where a first channel coding algorithm (CS-1) and a second channel coding algorithm (CS-2) provide a same net bit rate, making a first assumption that a packet error rate (PER) is greater than a PER of CS-1 at the crossing point, P1, when CS-1 is currently being used, or making as the first assumption that the PER is less than a PER of CS-2 at the crossing point, P2, when CS-2 is currently being used;

making as a further assumption, as reference case, that N_Number of packets have been transmitted with a constant PER equal to either P1 or P2, depending on the currently used channel coding algorithm CS-1 or CS-2;

determining a first probability (P-value) using said first count and said second count and the constant PER P1 or P2, depending on the currently used channel coding algorithm CS-1 or CS-2;

comparing P-value to a risk level (RL) for determining whether the first assumption can be rejected; and when the first assumption is rejected, changing to the other channel coding algorithm and resetting N_Number and K_Number;

making a second assumption that PER is less than the PER of CS-1, P1, when CS-1 is currently being used, or making as the second assumption that PER is greater than the PER of CS-2, P2, when CS-2 is currently being used;

making as the same further assumption, the same reference case, that N_Number of packets have been transmitted with a constant PER equal to either P1 or P2, depending on the currently used channel coding algorithm CS-1 or CS-2;

determining a second probability (P-value) using said first count and said second count and the constant PER P1 or P2, depending on the currently used channel coding algorithm CS-1 or CS-2;

comparing P-value to RL for determining whether the second hypothesis can be rejected; and when the second assumption is rejected, resetting N_Number and K_Number without changing to the other channel coding algorithm.

2. A method for operating a channel coder to operate with a first channel coding algorithm (CS-1) or a second channel coding algorithm (CS-2), comprising steps of:

maintaining a first count (N_Number) of transmitted packets and a second count (K_Number) of packets that are erroneously decoded at a receiver;

periodically performing a plurality of statistical tests in accordance with the steps of, when a current channel coding is CS-1:

determining whether a change should be made to CS-2 by making a first assumption that: PER>P1;

making as a further assumption, as a reference case, that N_Number of packets have been transmitted with a constant PER value of P1;

determining a probability (P-value) in accordance with:

$$P\text{-value} = \sum_{i=0}^{K\_Number} \binom{N\_Number}{i} P1^i (1-P1)^{N\_Number-i}$$

when P-value is less than a risk level (RL), rejecting the first assumption with (1-RL) confidence; and changing to CS-2, and resetting N_Number and K_Number, when P-value is not less than RL, continuing to average channel readings; and then confirming CS-1 by making a second assumption that: PER<P1;

making as the further assumption the same reference case;

determining the probability (P-value) in accordance with:

$$P\text{-value} = \sum_{i=0}^{K\_Number} \binom{N\_Number}{i} P1^i (1-P1)^{N\_Number-i}$$

when P-value is less than RL, rejecting the second assumption with (1-RL) confidence; and resetting N_Number and K_Number, when P-value is not less than RL, continuing to average channel readings;

for a case where the current channel coding is CS-2:
  determining whether a change should be made to CS-1 by making a third assumption that: PER<P2;
  making as the further assumption the same reference case;
  determining the probability (P-value) in accordance with:

$$P\text{-value} = \sum_{i=0}^{K\_Number} \binom{N\_Number}{i} P1^i (1-P1)^{N\_Number-i}$$

when P-value is less than RL, rejecting the third assumption with (1-RL) confidence; and changing to CS-1, and resetting N_Number and K_Number, when P-value is not less than RL, continuing to average channel readings; and then confirming CS-2 by making a fourth assumption that: PER>P2;

making as the further assumption the same reference case;

determining the probability (P-value) in accordance with:

$$P\text{-value} = \sum_{i=0}^{K\_Number} \binom{N\_Number}{i} P1^i (1-P1)^{N\_Number-i}$$

when P-value is less than RL, rejecting the fourth assumption with (1-RL) confidence;

resetting N_Number and K_Number, when P-value is not less than RL, continuing to average channel readings.

3. A method as in claim 2, wherein the steps of determining the P-value comprise an initial step of pre-computing P-values for a range of values of N_Number and K_Number and P1 and P2 values; storing the pre-computed values in at least one look-up table; and accessing the look-up table with current values of N_Number and K_Number to retrieve a corresponding P-value.

* * * * *